(12) United States Patent
Li

(10) Patent No.: US 12,436,615 B1
(45) Date of Patent: Oct. 7, 2025

(54) COGNITIVE ACCESSORY COMBINING BRAIN-COMPUTER INTERFACE AND SMART GLASSES

(71) Applicant: Beijing BoLian Times Commercial Plaza Co., Ltd., Beijing (CN)

(72) Inventor: Guo Li, Beijing (CN)

(73) Assignee: Beijing BoLian Times Commercial Plaza Co., Ltd., Beijing (CN)

( * ) Notice: Subject to any disclaimer, the term of this patent is extended or adjusted under 35 U.S.C. 154(b) by 0 days.

(21) Appl. No.: 19/185,489

(22) Filed: Apr. 22, 2025

(30) Foreign Application Priority Data

Mar. 10, 2025 (CN) .......................... 202520410622.5

(51) Int. Cl.
*G06F 3/01* (2006.01)
*G06F 3/16* (2006.01)
*G09G 3/00* (2006.01)

(52) U.S. Cl.
CPC .............. *G06F 3/015* (2013.01); *G06F 3/012* (2013.01); *G09G 3/001* (2013.01); *G06F 3/167* (2013.01); *G06F 2203/011* (2013.01); *G09G 2320/0626* (2013.01); *G09G 2354/00* (2013.01); *G09G 2360/144* (2013.01)

(58) Field of Classification Search
CPC .......... G06F 3/015; G06F 3/012; G06F 3/167; G06F 2203/011; A61B 5/163; A61B 5/16; A61B 5/291; A61B 5/369; A61B 5/6803; A61B 5/0042; A61B 5/6817; H04R 1/1016; H04R 1/406; G09G 3/001; G09G 2320/0626; G09G 2354/00; G09G 2360/144

See application file for complete search history.

(56) References Cited

U.S. PATENT DOCUMENTS

| | | | |
|---|---|---|---|
| 9,579,060 B1* | 2/2017 | Lisy | A61B 5/165 |
| 2013/0113973 A1* | 5/2013 | Miao | G02B 27/017 |
| | | | 348/E5.022 |
| 2013/0286053 A1* | 10/2013 | Fleck | G09G 5/377 |
| | | | 345/82 |

(Continued)

*Primary Examiner* — Temesghen Ghebretinsae
*Assistant Examiner* — Ivelisse Martinez Quiles
(74) *Attorney, Agent, or Firm* — Troutman Pepper Locke LLP; Tim Tingkang Xia, Esq.

(57) ABSTRACT

The present invention relates to wearable smart devices and neural engineering, disclosing a cognitive accessory that combines a brain-computer interface (BCI) with smart glasses, which includes an in-ear electrode module equipped with a plurality of EEG electrodes, a smart glasses frame with temples on both sides, a nose pad at the bottom of the frame, and two lenses installed on the frame. The smart glasses frame integrates a non-invasive brain signal acquisition module, an environmental perception module, an embedded processor, and an AR display module. The brain signal acquisition module uses flexible electrodes distributed inside the nose pad and the temples. By integrating flexible EEG electrodes and miniature fNIRS probes within the smart glasses frame, users can achieve efficient, non-invasive monitoring of brain electrical activity and cerebral blood oxygenation without wearing traditional complex headgear. This design makes the device more lightweight, comfortable, and convenient for long-term wear.

4 Claims, 8 Drawing Sheets

(56) References Cited

U.S. PATENT DOCUMENTS

| | | | | |
|---|---|---|---|---|
| 2015/0347080 | A1* | 12/2015 | Shin | G06F 3/012 |
| | | | | 345/173 |
| 2020/0356171 | A1* | 11/2020 | Furman | A61B 5/316 |
| 2022/0035180 | A1* | 2/2022 | Kan | G02B 27/02 |
| 2022/0210922 | A1* | 6/2022 | Uhm | H05K 1/028 |
| 2023/0038594 | A1* | 2/2023 | Pi | G06V 20/20 |
| 2023/0102507 | A1* | 3/2023 | Azemi | G06F 3/017 |
| | | | | 345/156 |
| 2023/0371832 | A1* | 11/2023 | Shin | G16H 40/67 |
| 2023/0380739 | A1* | 11/2023 | Ihlefeld | A61B 5/7225 |
| 2023/0389847 | A1* | 12/2023 | Ahmed | A61B 5/291 |

* cited by examiner

Non-invasive brain signal acquisition module 401

Flexible electrodes 205

Miniature fNIRS probes 4011

FIG. 7

Environmental perception module 402

Binocular RGB camera 205

Motion sensors 3

Audio sensors 206

FIG. 8

COGNITIVE ACCESSORY COMBINING BRAIN-COMPUTER INTERFACE AND SMART GLASSES

CROSS REFERENCE TO RELATED APPLICATIONS

This application claims priority to and benefit of Chinese Patent Application No. 202520410622.5, filed on Mar. 10, 2025 in the State Intellectual Property Office of P. R. China. The disclosure of the above application is incorporated herein by reference in its entirety.

TECHNICAL FIELD

The present invention relates to the intersection of wearable smart devices and neural engineering, specifically a cognitive accessory combining a brain-computer interface and smart glasses.

BACKGROUND

With the continuous development of brain-computer interface (BCI) technology and the popularization of smart wearable devices, how to effectively combine these two to enhance user cognitive experience and interaction efficiency has become a current research hotspot. BCI technology provides real-time brainwave monitoring and feedback to users by collecting neural signals such as electroencephalogram (EEG) and functional near-infrared spectroscopy. As a highly convenient wearable device, smart glasses have been widely used in augmented reality (AR) display, environmental perception, and intelligent assistance due to their lightweight, portability, and all-day wearability.

Existing brain-computer interface devices usually require head-mounted devices or attached electrodes to obtain EEG signals, which are often inconvenient for long-term wear when used.

SUMMARY

To address the shortcomings of existing technology, the present invention provides a cognitive accessory combining a brain-computer interface and smart glasses, solving the problem of devices being bulky and inconvenient for long-term wear.

To achieve the above object, the present invention is implemented through the following technical solution: a cognitive accessory combining a brain-computer interface and smart glasses, including:
- an in-ear electrode module (1), equipped with a plurality of EEG electrodes;
- a smart glasses frame (2), provided with temples on both sides, a nose pad at the bottom, and two lenses installed on the frame, wherein the smart glasses frame (2) integrates a non-invasive brain signal acquisition module, an environmental perception module, an embedded processor, and an AR display module; wherein
- the brain signal acquisition module uses flexible electrodes distributed inside the nose pad and the temples, with miniature fNIRS probes located at edges of the lenses;
- the environmental perception module comprises a binocular RGB camera integrated on an upper edge of the smart glasses frame (2), motion sensors embedded in the temples, and audio sensors located on both sides of the smart glasses frame (2);
- the binocular RGB camera supports SLAM environment modeling and eye tracking;
- the motion sensor comprises an accelerometer, a gyroscope, and a magnetometer, and the motion sensor is configured for head posture compensation and motion artifact elimination;
- the audio sensor uses a directional microphone array to capture environmental sounds and separate user voice commands; and
- the embedded processor comprises a front-end processing unit, a multi-modal fusion algorithm main control unit, and a communication interface.

Preferably, the smart glasses frame (2) is made of lightweight magnesium alloy, with flexible circuits built into the temples for connecting the EEG electrodes and the miniature fNIRS probes at the edges of the lenses.

Preferably, the ends of the temples are both integrated with power modules, which adopt a split design, and the ends of the temples are detachable from main bodies of the temples.

Preferably, two sets of flexible dry electrodes are embedded above the nose pads of the glasses, with Ag/AgCl coating on surfaces thereof, and the two sets of flexible dry electrodes are configured to collect EEG signals from the prefrontal cortex.

Preferably, an elastic hinge bracket is used between the temples and the smart glasses frame (2), the ends of the temples are configured as elastic telescopic structures, and an impedance detection chip is built into the temples to adjust a pressure according to a user's head circumference, ensuring a contact impedance between the electrodes and the skin is <10 kΩ.

Preferably, three miniature fNIRS probes are distributed inside each temple, and all the three miniature fNIRS probes are configured to monitor changes in blood oxygen levels in the temporal lobe and to identify memory load and fatigue state.

Preferably, the environmental perception module further comprises an ambient light sensor integrated below the smart glasses frame (2) for detecting an ambient light intensity and automatically adjusting the brightness of the AR display module.

Preferably, the in-ear electrode module (1) adopts an ergonomic design, fitting the contour of an ear to improve wearing comfort and stability.

Preferably, the AR display module uses a high-resolution, low-power display screen with eye protection features.

Preferably, the embedded processor is also integrated with a local storage unit for temporarily storing collected brain signal data, environmental perception data, and processed analysis results.

The present invention provides a cognitive accessory combining a brain-computer interface with smart glasses, offering the following beneficial effects:

1. By integrating flexible EEG electrodes and miniature fNIRS probes within the smart glasses frame, the present invention allows users to achieve efficient, non-invasive EEG and cerebral blood oxygen monitoring without the need for traditional complex headgear. This design makes the device more lightweight, comfortable, and suitable for long-term wear.
2. By integrating a binocular RGB camera, motion sensors, and audio sensors, the device can perceive the user's environment and motion status in real time, supporting eye tracking, head pose compensation, and motion artifact removal. At the same time, the audio sensor can accurately separate user voice commands, providing a more precise voice interaction experience.

3. By fusing EEG, fNIRS, eye tracking, and IMU data, the device can deeply analyze the user's cognitive state, attention distribution, emotional changes, and fatigue level, thereby providing personalized feedback to help users improve cognitive efficiency and avoid cognitive overload. Also, the device will document the raw emotional blueprints of users during particular moment or experience.

4. The smart glasses of this invention adopt a lightweight magnesium alloy frame, combined with flexible circuits and a split power supply design, ensuring that the device provides powerful functionality while maintaining a comfortable wearing experience, avoiding pressure on the head and eyes, and making it suitable for long-term use.

5. Based on real-time collected brain signal data and environmental information, the device can intelligently analyze and provide personalized cognitive state feedback, such as reminding users to rest, adjust posture, or enhance attention, thereby effectively improving the user's work efficiency and quality of life. Furthermore, the fusion of imagery and biometric signals would create a multi-dimensional narrative: not only does the photo or video document what was seen, but it also encodes the subtle interplay of feelings, thoughts, and sensations that accompany the experience. It would capture the intensity of your excitement, the calm of your reflection, or the nostalgia of a cherished memory, all in real-time.

BRIEF DESCRIPTION OF DRAWINGS

FIG. 7 is a block diagram of the environmental perception module of the cognitive accessory combining the brain-computer interface and smart glasses of this invention; and FIG. 8 is a block diagram of the non-invasive brain signal acquisition module of the cognitive accessory combining the brain-computer interface and smart glasses of this invention.

In the figure, 1. In-ear electrode module; 2. Smart glasses; 201. Smart glasses frame; 202. Temples; 203. Lenses; 204. Nose pad; 205. Flexible electrodes; 206. Audio sensors; 207. Impedance detection chip; 208. Binocular RGB camera; 209. Elastic hinge bracket; 3. Motion sensors; 4. Embedded processor; 401. Non-invasive brain signal acquisition module; 402. Environmental perception module; 403. AR display module; 4011. Miniature fNIRS probes.

DESCRIPTION OF EMBODIMENTS

The technical solution of this invention will be clearly and completely described below in conjunction with the accompanying drawings. Obviously, the described embodiments are only a part of the embodiments of this invention, not all of them. Based on the embodiments of this invention, all other embodiments obtained by ordinary technicians in the field without creative labor fall within the protection scope of this invention.

Figure 1:
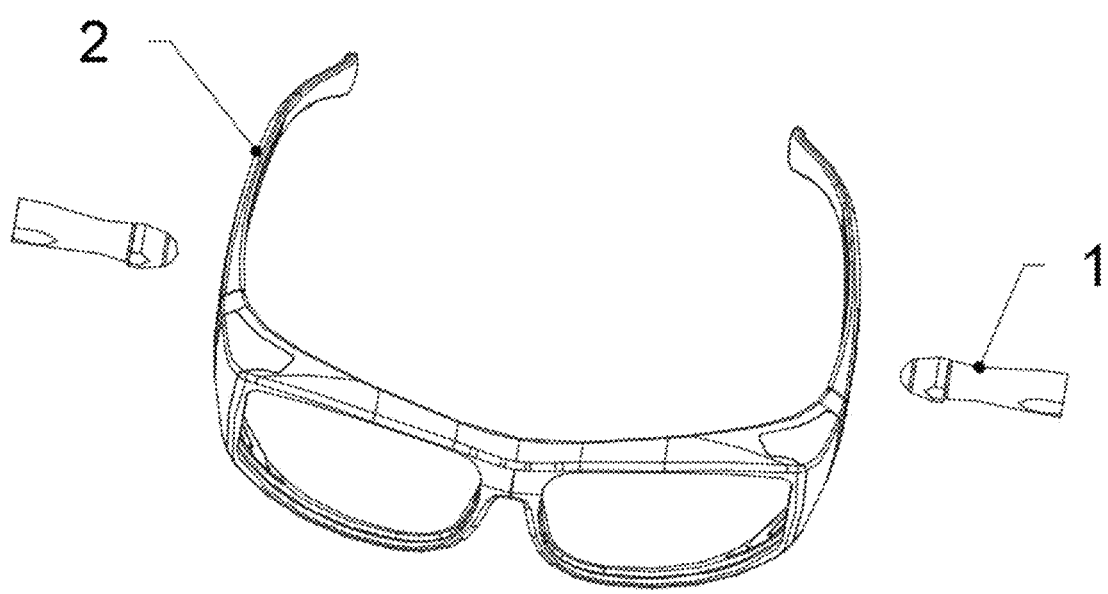
FIG. 1 is a schematic diagram of the overall structure of the cognitive accessory combining the brain-computer interface and smart glasses of this invention.
Figure 2:
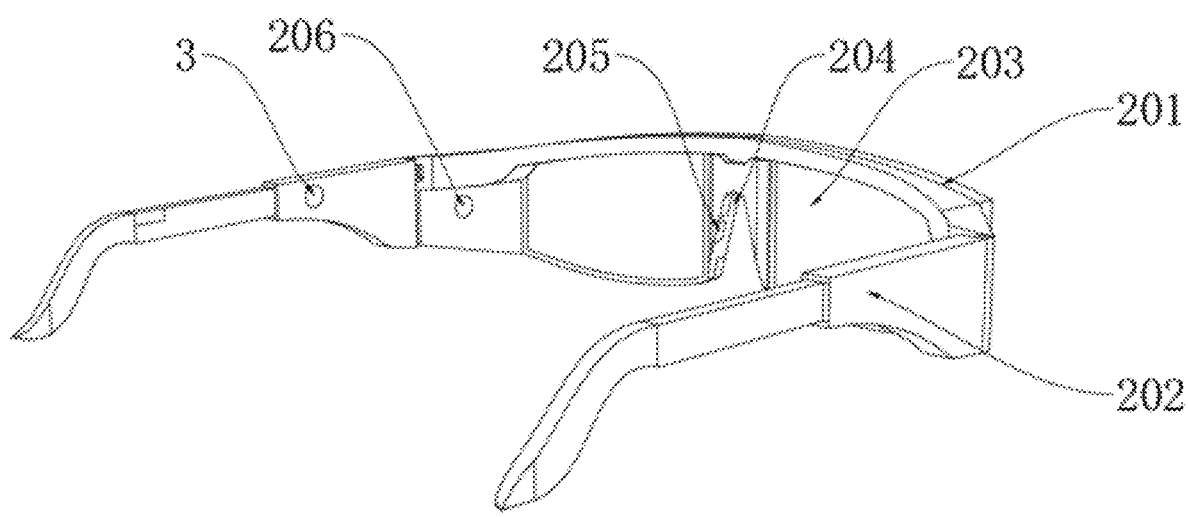
FIG. 2 is a schematic rear view of the smart glasses of the cognitive accessory combining the brain-computer interface and smart glasses of this invention.
Figure 3:
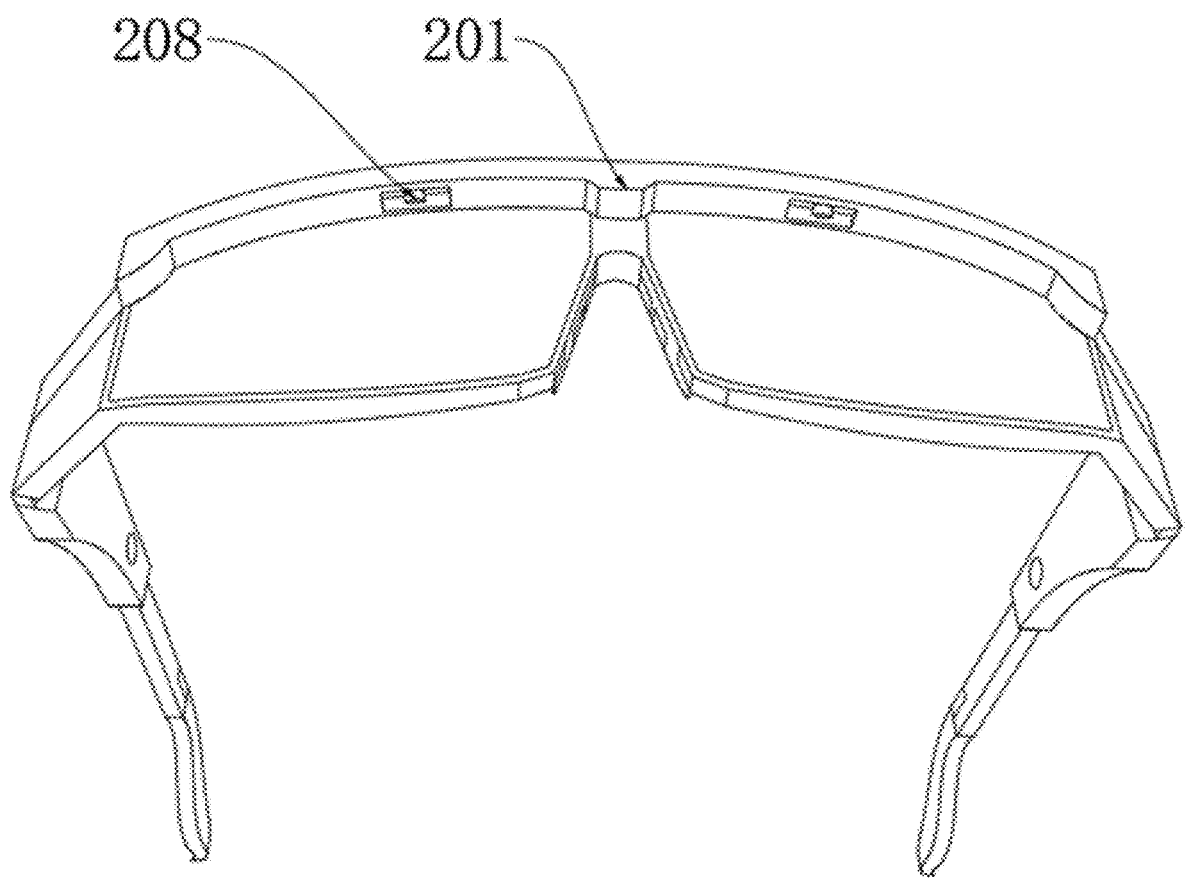
FIG. 3 is a schematic diagram of a binocular RGB camera of the cognitive accessory combining the brain-computer interface and smart glasses of this invention.
Figure 4:
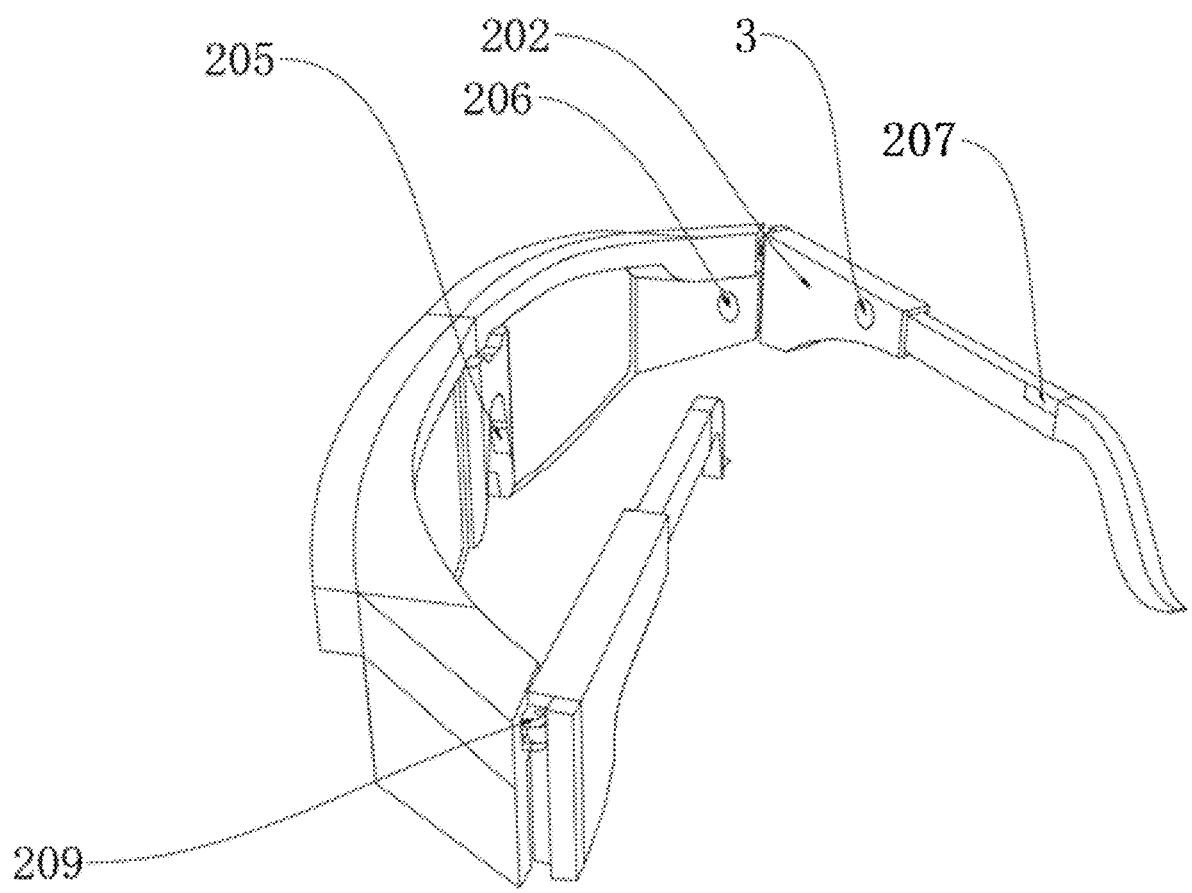
FIG. 4 is a folded schematic diagram of the smart glasses of the cognitive accessory combining the brain-computer interface and smart glasses of this invention.
Figure 5:
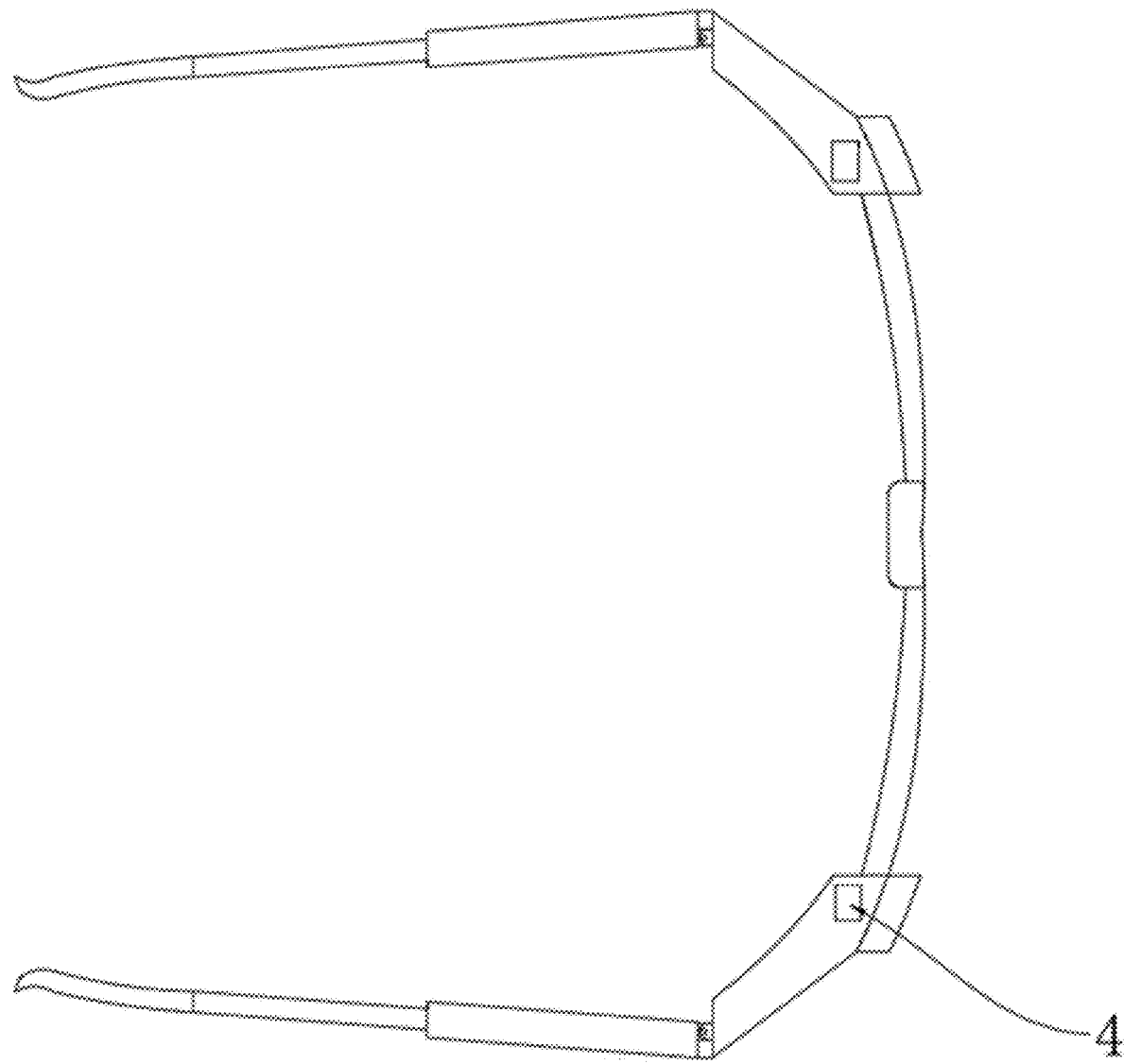
FIG. 5 is a cross-sectional schematic diagram of the smart glasses frame of the cognitive accessory combining the brain-computer interface and smart glasses of this invention.
Figure 6:
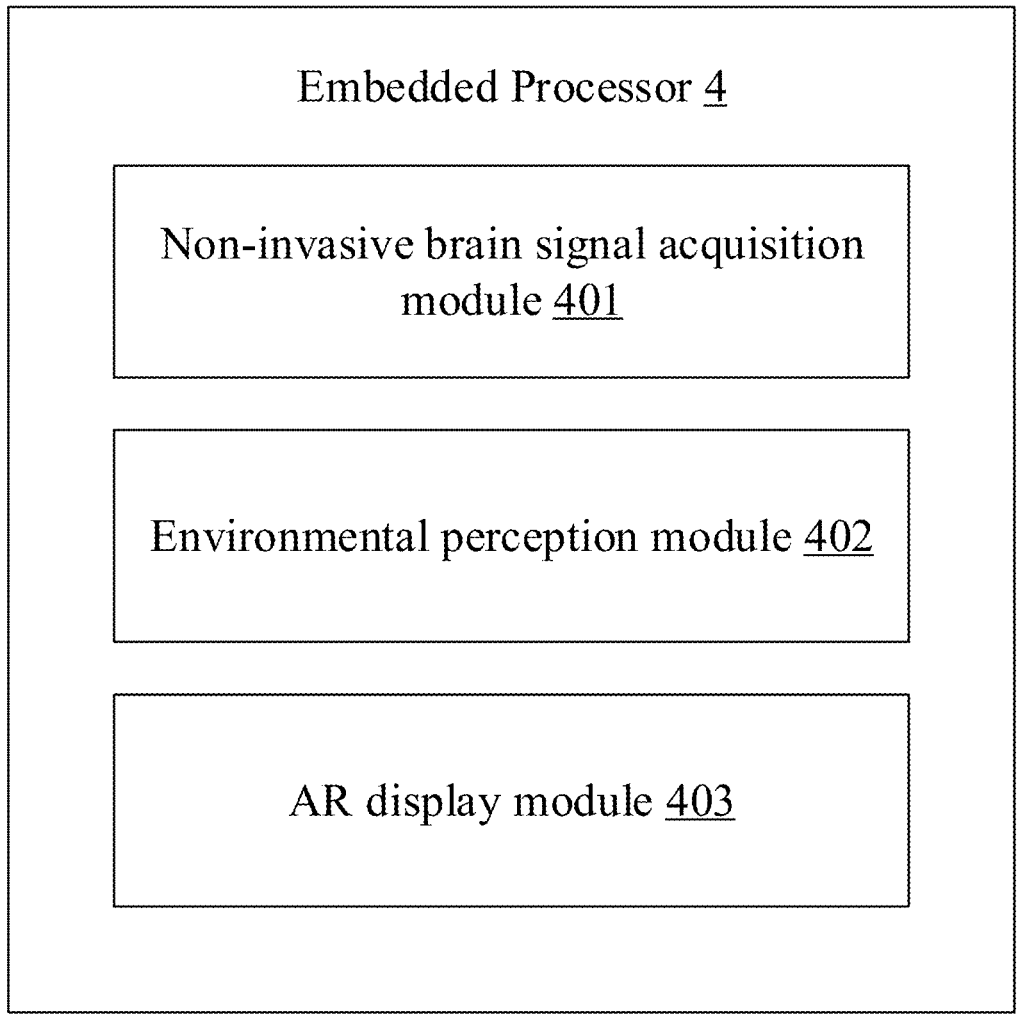
FIG. 6 is a block diagram of the embedded processor of the cognitive accessory combining the brain-computer interface and smart glasses of this invention.

Please refer to FIG. 1 to FIG. 8. The embodiment of this invention provides a cognitive accessory combining a brain-computer interface and smart glasses, including:

an in-ear electrode module 1, equipped with a plurality of EEG electrodes;

a smart glasses 2, including a smart glasses frame 201, the smart glasses frame 201 being provided with temples 202 on both sides, a nose pad 204 at the bottom, and two lenses 203 installed on the smart glasses frame 201, wherein the smart glasses frame 201 is provided with an embedded processor 4 disposed therein, and the embedded processor 4 integrates a non-invasive brain signal acquisition module 401, an environmental perception module 402, an embedded, and an AR display module 403; wherein the brain signal acquisition module 401 uses flexible electrodes 205 distributed inside the nose pad 204, with miniature fNIRS probes located at edges of the lenses 203;

the environmental perception module 402 comprises a binocular RGB camera 208 integrated on an upper edge of the smart glasses frame 201, motion sensors 3 embedded in the temples 202, and audio sensors 206 located on both sides of the smart glasses frame 201;

the binocular RGB camera 208 supports SLAM environment modeling and eye tracking;

the motion sensor 3 comprises an accelerometer, a gyroscope, and a magnetometer, and the motion sensor 3 is configured for head posture compensation and motion artifact elimination;

the audio sensor 206 uses a directional microphone array to capture environmental sounds and separate user voice commands; and the embedded processor 4 includes a front-end processing unit responsible for signal filtering and noise reduction, a multimodal fusion algorithm main control unit responsible for running the EEG+fNIRS+eye movement+IMU, and a communication interface supporting Bluetooth 5.2 and Wi-Fi6 for connecting to cloud AI model updates or local devices.

The in-ear electrode module 1 is a brain-computer interface, with a plurality of EEG electrodes set on the in-ear electrode module 1, which can effectively collect weak electrical signals emitted by the brain. The in-ear design brings the electrodes closer to the temporal lobe region of the brain, improving the accuracy and stability of signal collection, providing a data basis for analyzing brain neural activity, and helping to accurately capture user's thoughts and emotion-related neural signals. The EEG electrodes work based on the principle of bioelectric conduction, where tiny currents generated by brain neuron activity are conducted to the scalp surface. The EEG electrodes collect these electrical signals through contact with the ear canal. The design of the in-ear electrode module is based on the physiological structure of the human ear, ensuring a tight fit between the electrodes and the ear canal, reducing signal interference, and optimizing signal collection.

The smart glasses frame 2 is made of lightweight magnesium alloy, with flexible circuits built into the temples 202 for connecting the EEG electrodes and the miniature fNIRS probes at the edge of the lenses 203.

The smart glasses frame 2 is made of lightweight magnesium alloy, significantly reducing the overall weight of the glasses, enhancing wearing comfort, and allowing users to wear them for long periods without fatigue. At the same time, magnesium alloy has good strength and toughness, ensuring that the glasses frame 201 can withstand certain external forces without damage, ensuring the stability and durability of the device.

Magnesium alloy is an alloy based on magnesium with the addition of other elements, with a relatively low density, achieving lightweight while ensuring structural strength. The crystal structure and alloy composition of this material give it good mechanical properties, enabling it to meet the usage requirements of the smart glasses frame 2.

The temple-integrated flexible circuit connects the EEG electrodes with the miniature fNIRS probes at the edge of the lens, ensuring stable and reliable electrical connections between various functional modules. The flexible circuit can adapt to the bending and deformation of the temple, preventing line damage due to daily use, thus ensuring the stability of signal transmission and allowing brain neural signals and other physiological signals to be smoothly transmitted to subsequent processing modules.

Flexible circuits are typically composed of a flexible substrate, conductive traces, and a cover layer. The flexible substrate is made of flexible polyimide, which can bend to a certain extent without affecting the performance of the conductive traces. The conductive traces are fabricated on the flexible substrate through special printing or etching processes and are responsible for transmitting electrical signals.

Both ends of each temple 202 are integrated with power modules, which adopt a modular design. The ends of the temples 202 and the main body of the temples 202 are detachable structures.

This allows users to quickly replace the power module when its battery is depleted, ensuring continuous operation of the device. Additionally, the modular design helps balance the overall weight distribution of the glasses, further enhancing wearing comfort.

The modular power module is connected to the main body of the temple through an electrical interface, enabling power transmission. The detachable structure typically uses magnetic connections for user convenience, ensuring stable electrical connections while meeting the need for quick power replacement.

Above the nose pad 204 of the glasses, two sets of flexible dry electrodes are embedded as the flexible electrodes 205, coated with Ag/AgCl, and both the two sets of flexible dry electrodes 205 are designed to collect EEG signals from the prefrontal cortex.

Above the nose pad 204 of the glasses, the two sets of flexible dry electrodes 205 coated with Ag/AgCl are embedded, specifically designed to collect EEG signals from the prefrontal cortex. The prefrontal cortex is closely related to advanced cognitive functions such as attention, emotional regulation, and decision-making. Collecting EEG signals from this region helps in-depth analysis of the user's cognitive state and emotional changes, providing data support for subsequent targeted feedback and interventions.

The Ag/AgCl coating has excellent conductivity and biocompatibility, reducing the contact resistance between the electrode and the skin, thereby improving the quality of signal acquisition. The flexible dry electrodes can conform to the skin surface above the nose pad, adapting to different users' facial contours, ensuring stable signal acquisition. The electrical signals generated by the neuronal activity in the prefrontal cortex are conducted through the skin to the electrodes and then collected.

The temples 202 are connected to the smart glasses frame 2 via an elastic hinge bracket 209, with the ends of the temples 202 featuring an elastic telescopic structure. The temples 202 are equipped with an impedance detection chip 207 that adjusts the pressure based on the user's head circumference, ensuring the contact impedance between the electrodes and the skin is <10 kΩ.

The temples 202 can automatically adjust the pressure on the head based on the user's head circumference, ensuring that the contact impedance between the electrodes and the skin is always less than 10 kΩ. This guarantees good contact between the electrodes and the skin, improving the quality and stability of signal acquisition. Regardless of the user's head size or slight head movements during wear, the device can function properly and accurately capture neural signals.

The elastic hinge bracket 209 allows the temples 202 to flexibly rotate within a certain angle range to adapt to different head shapes and wearing habits. The elastic telescopic temples 202 can automatically adjust their length based on external pressure through the internal elastic structure. The impedance detection chip 207 continuously monitors the contact impedance between the electrodes and the skin. When the impedance exceeds the set threshold, the pressure of each temple 202 is adjusted by a feedback mechanism to keep the impedance within an appropriate range, based on the principles of impedance measurement and feedback control in electrical engineering.

Three miniature fNIRS probes are distributed inside each temple 202. These probes are used to monitor changes in blood oxygen levels in the temporal lobe and to identify memory load and fatigue states.

The temporal lobe of the brain is associated with memory and auditory processing functions. By monitoring changes in blood oxygen levels in the temporal lobe, it is possible to indirectly reflect the metabolic activity of neural activity in this region. This provides important data for assessing the user's cognitive state, helping users to understand their own condition in a timely manner and take appropriate measures to adjust, avoiding excessive fatigue or high cognitive load.

The miniature fNIRS probes operate based on near-infrared spectroscopy technology. Near-infrared light can penetrate the scalp and skull to enter brain tissue. Different brain tissue components have different absorption and scattering characteristics for near-infrared light. When neural activity increases, the blood oxygen content in local brain tissue changes. By detecting changes in the absorption and scattering of near-infrared light in brain tissue, the changes in blood oxygen levels in the temporal lobe can be inferred, thereby enabling the monitoring of cognitive states.

The environmental perception module also includes an ambient light sensor integrated below the smart glasses frame 201, which is used to detect ambient light intensity and automatically adjust the brightness of the AR display module 403.

Real-time detection of ambient light intensity, and automatic adjustment of the brightness of the AR display module 403, ensuring that users can clearly see the AR display content in different lighting environments, while avoiding discomfort caused by overly bright or dark displays, thereby improving user experience.

Ambient light sensors typically use photoresistors. When the ambient light intensity changes, the resistance value of the photosensitive element changes accordingly. This change is converted into an electrical signal through a circuit and transmitted to the control unit, which adjusts the brightness of the AR display module 403 based on preset algorithms to achieve automatic adjustment.

The in-ear electrode module 1 adopts an ergonomic design, fitting the contour of the ear to enhance wearing comfort and stability.

The AR display module 403 features a high-resolution, low-power display screen with eye protection functionality.

The high-resolution display screen uses an AR display with a single-eye resolution of 1080×1200 or higher. The high-resolution display can clearly present various visual feedback information, enabling users to accurately understand their cognitive state. The low-power characteristic helps extend the device's battery life, reduce charging frequency, and improve portability and convenience. The eye protection function reduces harm to the user's eyes by adjusting the screen's brightness, color temperature, and blue light ratio, making it suitable for prolonged use.

The embedded processor 4 also integrates a local storage unit for temporarily storing collected brain signal data, environmental perception data, and processed analysis results.

The local storage unit integrated in the embedded processor 4 is used for temporarily storing collected brain signal data, environmental perception data, and processed analysis results. In cases of poor or no network connection, it ensures that data is not lost and allows for continued local data analysis and processing. Additionally, local storage helps improve data processing efficiency, reduces delays caused by data transmission, and supports real-time feedback and quick decision-making.

Although embodiments of the present invention have been shown and described, it can be understood by those skilled in the art that various changes, modifications, substitutions, and variations can be made to these embodiments without departing from the principles and spirit of the present invention. The scope of the present invention is defined by the appended claims and their equivalents.

What is claimed is:

1. A cognitive accessory combining a brain-computer interface (BCI) with smart glasses, comprising:
    an in-ear electrode module (1);
    a smart glasses frame (201), provided with temples (202) on both sides, a nose pad (204), and two lenses (203) installed on the frame, wherein the smart glasses frame (201) is provided with an embedded processor (4) disposed therein, and the embedded processor (4) integrates a non-invasive brain signal acquisition module (401), an environmental perception module (402), and an augmented reality (AR) display module (403); wherein
    the brain signal acquisition module (401) uses flexible electrodes (205) distributed inside the nose pad (204);
    the environmental perception module (402) comprises a binocular red-green-blue (RGB) camera (208) integrated on an upper edge of the smart glasses frame (201), motion sensors (3) embedded in the temples (202), and audio sensors (206) located on both sides of the smart glasses frame (201);
    the binocular RGB camera (208) supports simultaneous localization and mapping (SLAM) environment modeling and eye tracking;
    the motion sensor (3) comprises an accelerometer, a gyroscope, and a magnetometer, and the motion sensor (3) is configured for head posture compensation and motion artifact elimination;
    the audio sensor (206) uses a directional microphone array to capture environmental sounds and separate user voice commands; and
    an elastic hinge bracket (209) is provided between the temples (202) and the smart glasses frame (201), ends of the temples (202) are configured as elastic telescopic structures, and an impedance detection chip (207) is built into the temples (202) to adjust a pressure according to a user's head circumference, ensuring a contact impedance between the flexible electrodes (205) and skin is <10 k$\Omega$.

2. The cognitive accessory combining the brain-computer interface with the smart glasses according to claim 1, wherein the smart glasses frame (201) is made of lightweight magnesium alloy.

3. The cognitive accessory combining the brain-computer interface with the smart glasses according to claim 1, wherein the ends of the temples (202) are both integrated with power modules, which adopt a split design, and the ends of the temples are detachable from main bodies of the temples.

4. The cognitive accessory combining the brain-computer interface with the smart glasses according to claim 1, wherein the in-ear electrode module (1) adopts an ergonomic design, fitting contour of an ear to improve wearing comfort and stability.

* * * * *